(12) United States Patent
Ishikawa

(10) Patent No.: US 8,184,784 B2
(45) Date of Patent: May 22, 2012

(54) METHOD AND DEVICE FOR DATA COMMUNICATION

(75) Inventor: Satoshi Ishikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1399 days.

(21) Appl. No.: 11/802,487

(22) Filed: May 23, 2007

(65) Prior Publication Data
US 2007/0286406 A1    Dec. 13, 2007

(30) Foreign Application Priority Data

May 24, 2006 (JP) ................. 2006-143969
Apr. 11, 2007 (JP) ................. 2007-104260

(51) Int. Cl.
*H04M 11/00* (2006.01)
(52) U.S. Cl. .................... 379/100.15; 379/100.05
(58) Field of Classification Search ............ 379/100.05, 379/100.15
See application file for complete search history.

(56) References Cited

U.S. PATENT DOCUMENTS 5,787,164 A * 7/1998 Haines et al. ................ 379/372
6,208,731 B1 * 3/2001 DePond et al. .......... 379/376.01
7,092,499 B2 * 8/2006 Saito et al. ............... 379/100.16

FOREIGN PATENT DOCUMENTS

| JP | 56-14020 | 4/1981 |
|---|---|---|
| JP | 61-013868 | 1/1986 |
| JP | 2000-188639 | 7/2000 |
| JP | 2001-007943 | 1/2001 |
| JP | 2002-079723 | 3/2002 |
| JP | 2002-185753 | 6/2002 |
| JP | 2002-190873 | 7/2002 |

* cited by examiner

*Primary Examiner* — Simon Sing
(74) *Attorney, Agent, or Firm* — Harness, Dickey & Pierce, P.L.C.

(57) ABSTRACT

A novel data communication device includes a switching mechanism, a detector, a storage, a measuring unit, a comparator, and a controller. In at least one embodiment, the switching mechanism is configured to connect and disconnect a facsimile device to and from a communication line used in common by the data communication device and the facsimile device. The detector is configured to detect an off-hook state of the facsimile device. The storage is configured to store a delay time. The measuring unit is configured to measure a reference time and a dialing detection time. The comparator is configured to compare the reference time and the dialing detection time. The controller is configured to enable or disable a facsimile priority function depending on whether or not the reference time and the dialing detection time are substantially equal to each other.

21 Claims, 9 Drawing Sheets

METHOD AND DEVICE FOR DATA COMMUNICATION

PRIORITY STATEMENT

The present patent application claims priority under 35 U.S.C.§119 upon Japanese Patent Application No. 2006-143969, filed in the Japanese Patent Office on May 24, 2006, and Japanese Patent Application No. 2007-104260, filed in the Japanese Patent Office on Apr. 11, 2007, the entire contents and disclosures of each of which are hereby incorporated herein by reference in their entirety.

BACKGROUND

1. Field

Embodiments of the present invention generally relate to a method and/or device for data communication; for example to a method and/or device for data communication used with a facsimile device capable of automatically determining the type of the facsimile device and properly setting up a function related to the facsimile device.

2. Discussion of the Background

Recently, management systems for image forming apparatuses have enabled managers of one or more image forming apparatuses to remotely manage them via networks using telecommunication devices.

In a typical management system for image forming apparatuses, one or more image forming apparatuses at a plurality of customers' workplaces are connected to a central control unit installed at a service center (i.e., a facility for sales and technical support) via public lines or other communication lines using data communication devices such as communication adapters. The manager can manage the image forming apparatuses from the service center by operating the central control unit.

In such management system, when the data communication device is directly connected to the public line, the central control unit is caused to dial the customer's telephone number (i.e., a telephone number that gives access to the data communication device) and sends a dual-tone multi-frequency (DTMF) signal as a communication identifier for identifying the central control unit (referred to as identification tone signal). By doing so, the central control unit can access to the data communication device.

A drawback of this background management system is high cost as providing access between the central control unit and the data communication device has needed a line dedicated for this purpose.

To eliminate this drawback, an existing management system for image forming apparatuses has made it possible to access the data communication device over an existing line for a different communication apparatus, such as a facsimile device and a telephone device, which is installed at customers' workplace.

Consequently, in this existing management system, the data communication device and the different communication apparatus share the common line. Therefore, the data communication device is joined with the different communication apparatus in addition to the image forming apparatuses supported by the management system.

For example, the data communication device is connected with a communication apparatus having a facsimile function and an image forming apparatus at the customer's side. To access the data communication device, the central control unit is caused to dial the customer's telephone number. In response to the dialing, the communication apparatus receives a ringing signal via the public line. While the communication apparatus goes off-hook to establish connection, the central control unit sends the DTMF signal to be detected by the data communication device. Upon the detection of the DTMF signal, the data communication device disconnects the communication apparatus from the public line to communicate with the central control unit.

In addition, the data communication device is provided with a facsimile priority mode that gives higher priority to transmission of facsimile data than handling of the image forming apparatus. In the facsimile priority mode, when detecting an off-hook state of the communication apparatus, the data communication device terminates communication with the central control unit to allow the communication apparatus to use the line for facsimile transmission.

After terminating the communication with the central control unit, the data communication device transmits an end signal to an exchange for indicating the end of the communication. This end signal represents an on-hook state of a set period of time. Upon receiving the signal, the exchange gets ready for receiving a dialing signal from the communication apparatus.

Such a facsimile priority mode can be used only with communication apparatuses whose facsimile function establishes communication by detecting a dial tone signal (hereinafter referred to as dial tone detection type). The dial tone detection type apparatus starts dialing when detecting a dial tone signal from the line after going off-hook.

Another type of the facsimile function is referred to as blind dialing type. The blind dialing type apparatus starts dialing when a given period of time has elapsed after going off-hook.

This blind dialing type apparatus may fail to correctly transmit leading digits of the dialed number when the dialing is started before the end signal is fully received by the exchange or before the exchange becomes ready for receiving the dialing signal.

To avoid such an incomplete or incorrect transmission of the dialed number that may lead to a wrong transmission, the facsimile priority mode is, in general, not used with the blind dialing type apparatus. Namely, when using the common line with the blind dialing type apparatus, the data communication device is set up to continue communication regardless of the hook state of the blind dialing type apparatus.

Consequently, the facsimile priority mode of the data communication device is turned on or off according to whether the communication apparatus is a blind dialing type or a dial tone detection type. Therefore, correct identification of the communication apparatus type is needed.

To newly install the data communication device, a provider of the management system identifies the type of the communication apparatus at the customer's workplace. By turning on or off the facsimile priority mode, the provider offers an appropriate service in accordance with the type of the communication apparatus.

The communication apparatus type may be easily identified as long as the communication apparatus is a product of the provider of the management system. However, when the customer uses a product manufactured by another company, the identification of the communication apparatus type is practically difficult. As a result, the facsimile priority mode is not used with the communication apparatus manufactured by another company.

In addition, there may be a case where the facsimile priority mode is improperly used with the blind dialing type apparatus. Such case may occur when the customer replaces a dial tone detection type apparatus with a blind dialing type apparatus without disabling the facsimile priority mode to be used with the replaced dial tone detection type apparatus.

These inconveniences accompanying the management system of image forming apparatuses may be solved by providing a mechanism that can automatically determine the type of the communication apparatus and properly set up the facsimile priority mode. Preferably, such a mechanism is included in the data communication device used with the communication apparatus.

SUMMARY

This patent specification describes, in at least one embodiment, a novel data communication device used with a facsimile device that can automatically determine the type of the facsimile device and properly set up a function related to the facsimile device.

In one example embodiment, a novel data communication device includes a switching mechanism, a detector, a storage, a measuring unit, a comparator, and a controller. The switching mechanism is configured to connect and disconnect a facsimile device to and from a communication line used in common by the data communication device and the facsimile device. The detector is configured to detect an off-hook state of the facsimile device. The storage is configured to store a given delay time to be inserted between detection of the off-hook state of the facsimile device and connection of the facsimile device to the communication line. The measuring unit is configured to measure a reference time and a dialing detection time, and store the reference time and the dialing detection time in the storage.

The reference time is an interval between the detection of the off-hook state of the facsimile device and transmission of a first digit dialed by the facsimile device. The dialing detection time is an interval between the connection of the facsimile device to the communication line and the transmission of a first digit dialed by the facsimile device measured with the given delay time. The comparator is configured to compare the reference time and the dialing detection time. The controller is configured to enable a facsimile priority function when the reference time and the dialing detection time are substantially equal to each other. The controller is further configured to disable the facsimile priority function when the reference time and the dialing detection time are different from each other. The facsimile priority function is an arrangement in which the data communication device ends communication when the detector detects the off-hook state of the facsimile so that the facsimile uses the communication line.

This patent specification further describes a novel data communication method used with a facsimile device for automatically determining the type of the facsimile device and properly setting up a function related to the facsimile device.

In one example embodiment, a novel data communication method includes the steps of switching, detecting, first measuring, storing, second measuring, comparing, and setting. The switching step switches connection of a facsimile device to a communication line used in common by the data communication device and the facsimile device. The detecting step detects an off-hook state of the facsimile device. The first measuring step measures a reference time.

The reference time is an interval between detection of the off-hook state of the facsimile device and transmission of a first digit dialed by the facsimile device. The storing step stores a given delay time to be inserted between the detection of the off-hook state of the facsimile device and connection of the facsimile device to the communication line. The second measuring step measures a dialing detection time with the given delay time. The dialing detection time is an interval between the connection of the facsimile device to the communication line and the transmission of a first digit dialed by the facsimile device.

The comparing step compares the reference time and the dialing detection time. The setting step controls a facsimile priority function to be enabled when the reference time and the dialing detection time are substantially equal to each other, and disabled when the reference time and the dialing detection time are different from each other. The facsimile priority function is an arrangement in which the data communication device ends communication when the detector detects the off-hook state of the facsimile so that the facsimile uses the communication line.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/ or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Figure 1:
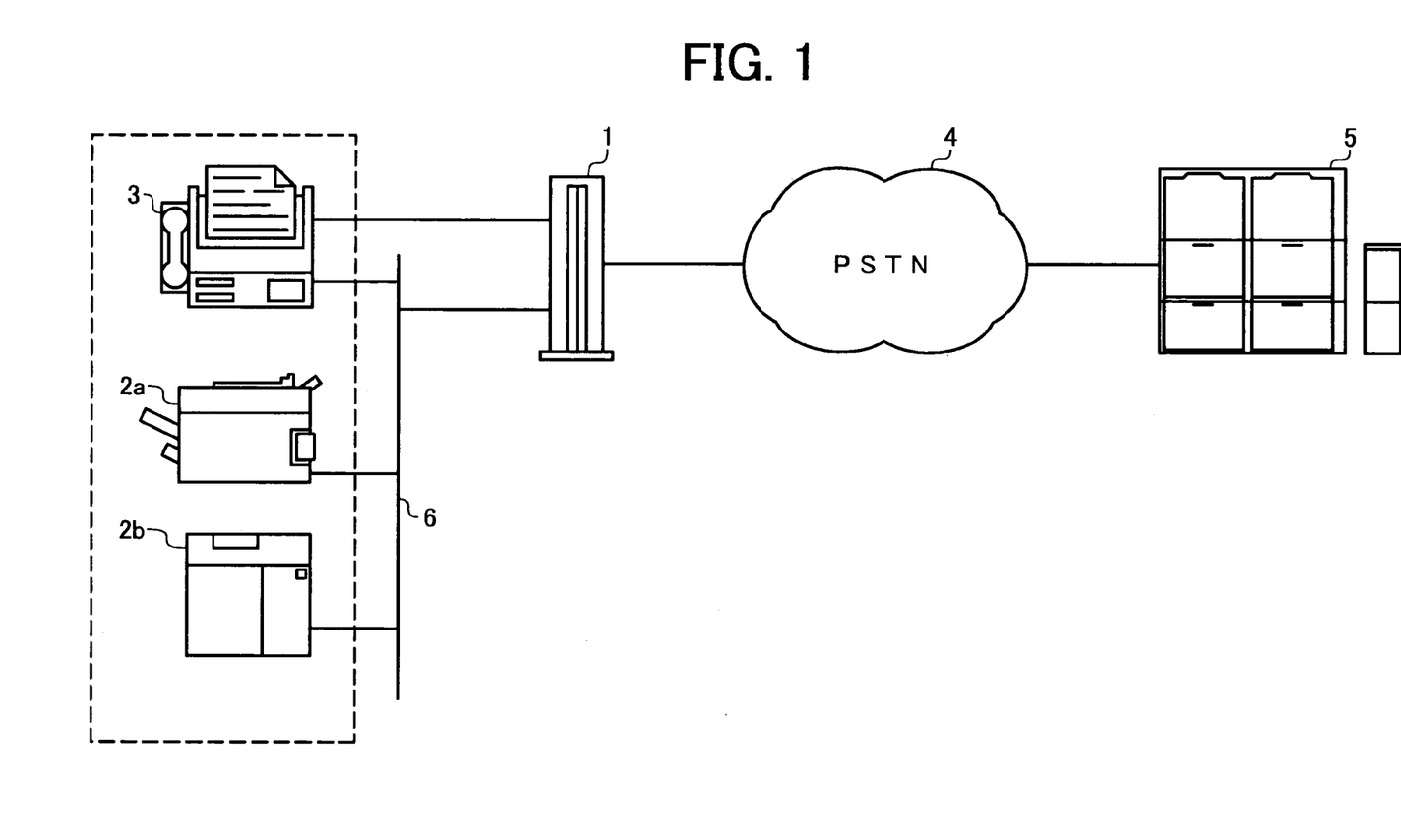
FIG. 1 is a schematic diagram illustrating a management system for image forming apparatuses according to at least one example embodiment of the present invention.

Referring to FIG. 1 of the drawings, a schematic diagram illustrating a management system for image forming apparatuses according to at least one example embodiment of the present invention is described.

In FIG. 1, the management system includes a data communication device 1, image forming apparatuses 2a and 2b, a facsimile 3, a public switched telephone network (PSTN) line 4, a central control unit 5, and a local area network (LAN) 6.

The data communication device 1 is connected with the image forming apparatuses 2a and 2b and the facsimile 3 via the LAN 6 and acquires data from the connected components over the LAN 6.

The facsimile 3 may be either one of a dial tone detection type and a blind dialing type. The dial tone detection type refers to an apparatus that starts dialing when detecting a dial tone signal from the PSTN line 4 after going off-hook. The blind dialing type refers to an apparatus that starts dialing when a given period of time has elapsed after going off-hook.

The PSTN line 4 allows the data communication device 1 and the central control unit 5 to transmit data between them. The PSTN line 4 is also used by the facsimile 3 to transmit and receive facsimile data.

In addition, the data communication device 1 has a feature referred to as a facsimile priority mode that gives higher priority to transmission of facsimile data than handling of the image forming apparatuses 2a and 2b. The data communication device 1 determines the type of the facsimile 3 and sets up the facsimile priority mode according to the determination (hereinafter referred to as "mode determination").

Namely, in the mode determination, the facsimile priority mode is enabled for the dial tone detection type apparatus, and disabled for the blind dialing type apparatus.

Figure 2:
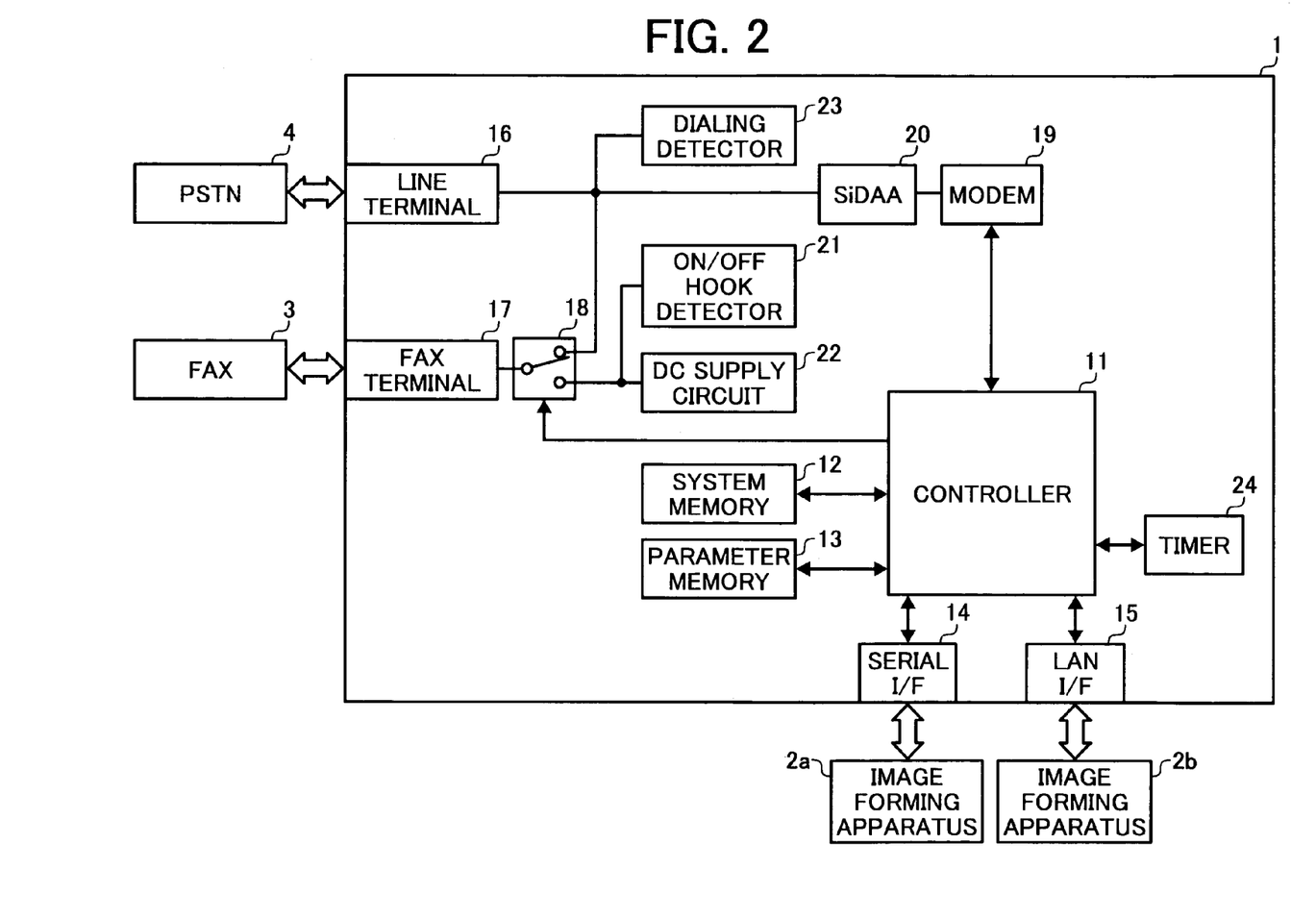
FIG. 2 is a block diagram illustrating a data communication device according to an example embodiment of the present invention.

Referring to FIG. 2, a block diagram of the data communication device 1 according to a preferred embodiment of the present invention is described.

The data communication device 1 includes a controller 11, a system memory 12, a parameter memory 13, a serial interface (I/F) 14, and a LAN I/F 15. In addition, the data communication device 1 also includes a line terminal 16, a fax terminal 17, a switch 18, a modem 19, a silicon data access arrangement (SiDAA) 20, an on/off hook detector 21, a direct current (DC) supply circuit 22, a dialing detector 23, and a timer 24.

In FIG. 2, the data communication device 1 is connected with the image forming apparatuses 2a and 2b, the facsimile 3, and the PSTN line 4.

In the data communication device 1, the controller 11 performs overall control of the data communication device 1 by executing a control program (not shown).

The system memory 12 stores the control program and various types of data required to execute the control program. The system memory 12 also serves as a work area for the controller 11.

The parameter memory 13 stores particular types of data associated with the data communication device 1.

The serial I/F 14 connects the image forming apparatus 2a to the data communication device 1. The LAN I/F 15 connects the image forming apparatus 2b to the data communication device 1.

The line terminal 16 connects the PSTN line 4 to the data communication device 1. The fax terminal 17 connects the facsimile 3 to the data communication device 1.

The switch 18 is used to connect/disconnect the facsimile 3 to/from the PSTN line 4. The switch 18 is turned on to connect the fax terminal 17 to the line terminal 16, and turned off to disconnect the fax terminal 17 from the line terminal 16.

The modem 19 provides access to signals sent over the PSTN line 4, allowing communication with the central control unit 5. Specifically, the modem 19 modulates a digital signal to an analog signal, and demodulates an analog signal to a digital signal.

The SiDAA 20 is an interface between the modem 19 and the PSTN line 4. The SiDAA 20 detects a ringing signal from the PSTN line 4, and determines whether the PSTN line 4 is in an open-loop state or a closed-loop state. The SiDAA 20 receives commands from the controller 11 via the modem 19.

The on/off hook detector 21 detects whether the facsimile 3 is in an on-hook state or an off-hook state while the fax terminal 17 is disconnected from the PSTN line 4. The on-hook state refers to an idle state of the facsimile 3 with a handset placed on a holder. The off-hook state refers to an active state of the facsimile 3 with the handset removed from the holder.

The DC supply circuit 22 is used to detect the off-hook state of the facsimile 3 while the facsimile 3 is disconnected from the PSTN line 4.

The dialing detector 23 detects a dialing signal such as a dual-tone multi-frequency (DTMF) signal and a dial pulse sent over the PSTN line 4.

The timer 24 performs time measurement in the mode determination. Particularly, the timer 24 signals the end of a delay time T1 or T2, and measures time intervals such as a reference time Tr and a dialing detection time Tdd.

The delay time T1 and T2 are appropriately given and stored in the parameter memory 13. The measured reference time Tr and dialing detection time Tdd are recorded in the parameter memory 13.

In the mode determination, the data communication device 1 acquires the reference time Tr and the dialing detection time Tdd using the given delay time T1 and T2 to determine whether to enable or disable the facsimile priority mode by comparing the reference time Tr and the dialing detection time Tdd.

Referring now to FIGS. 3A through 3E, a flow chart illustrating the mode determination of the data communication device 1 of FIG. 2 is described.

Figure 3A:
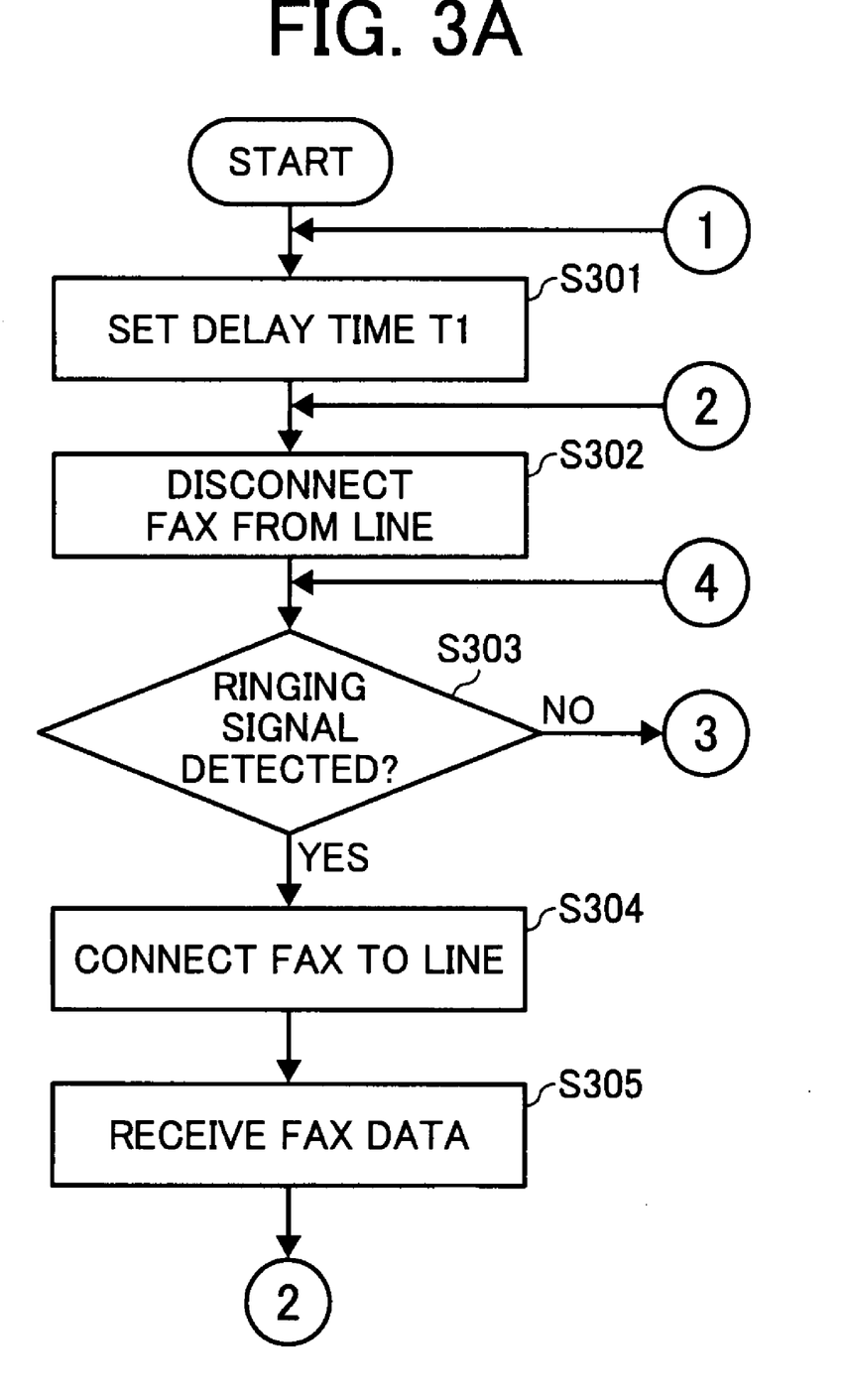
FIG. 3A is a flow chart illustrating an operation of the data communication device of FIG. 2.

With particular reference to FIG. 3A, first, the controller 11 sets the delay time to T1 (step S301).

Next, the switch 18 is turned off to disconnect the facsimile 3 from the PSTN line 4 (step S302). Then, the SiDAA 20 monitors the PSTN line 4 for the ringing signal (step S303).

When the SiDAA 20 detects the ringing signal ("YES" in step S303), the switch 18 is turned on to connect the facsimile 3 to the PSTN line 4 (step S304). Then, facsimile data is received in a given manner (step S305). Afterwards, the operation goes back to step S302.

Figure 3B:
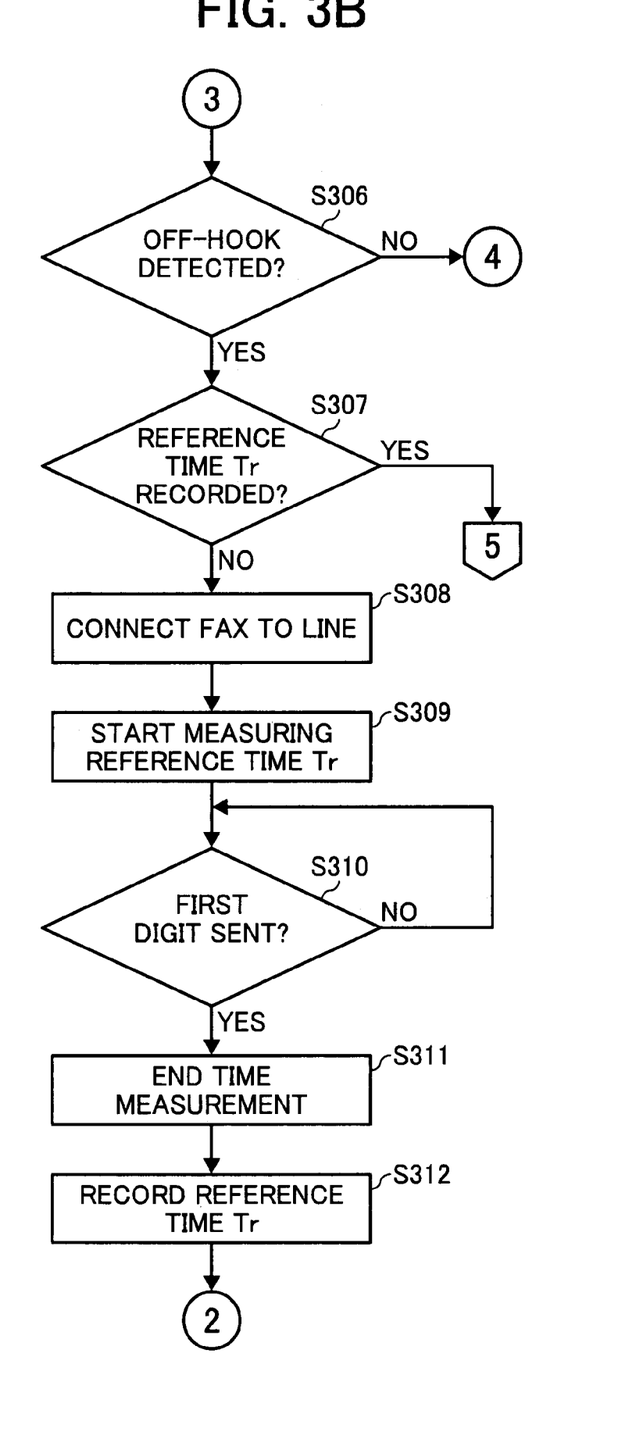
FIG. 3B is a flow chart illustrating an operation of the data communication device of FIG. 2.

With particular reference to FIG. 3B, when the SiDAA 20 does not detect the ringing signal ("NO" in step S303), the on/off hook detector 21 determines whether the facsimile 3 is in the on-hook state or not (step S306).

When the facsimile 3 is determined as in the off-hook state ("NO" in step S306), the operation goes back to step S303.

When the on/off hook detector 21 detects the on-hook of the facsimile 3 ("YES" in step S306), the controller 11 determines whether the reference time Tr is recorded or not in the parameter memory 13 (step S307).

When the reference time Tr is not recorded ("NO" in step S307), the controller 11 immediately turns on the switch 18 to connect the facsimile 3 to the PSTN line 4 (step S308) while the timer 24 starts measuring the reference time Tr (step S309).

Then, the dialing detector 23 monitors the PSTN line for a transmitted dialing signal (step S310). When the dialing detector 23 detects a first digit of the dialing signal ("YES" in step S310), the timer 24 ends measuring the reference time Tr (step S311). The measured reference time Tr is recorded in the parameter memory 13 (step S312). Afterwards, the operation goes back to step S302.

Figure 3C:
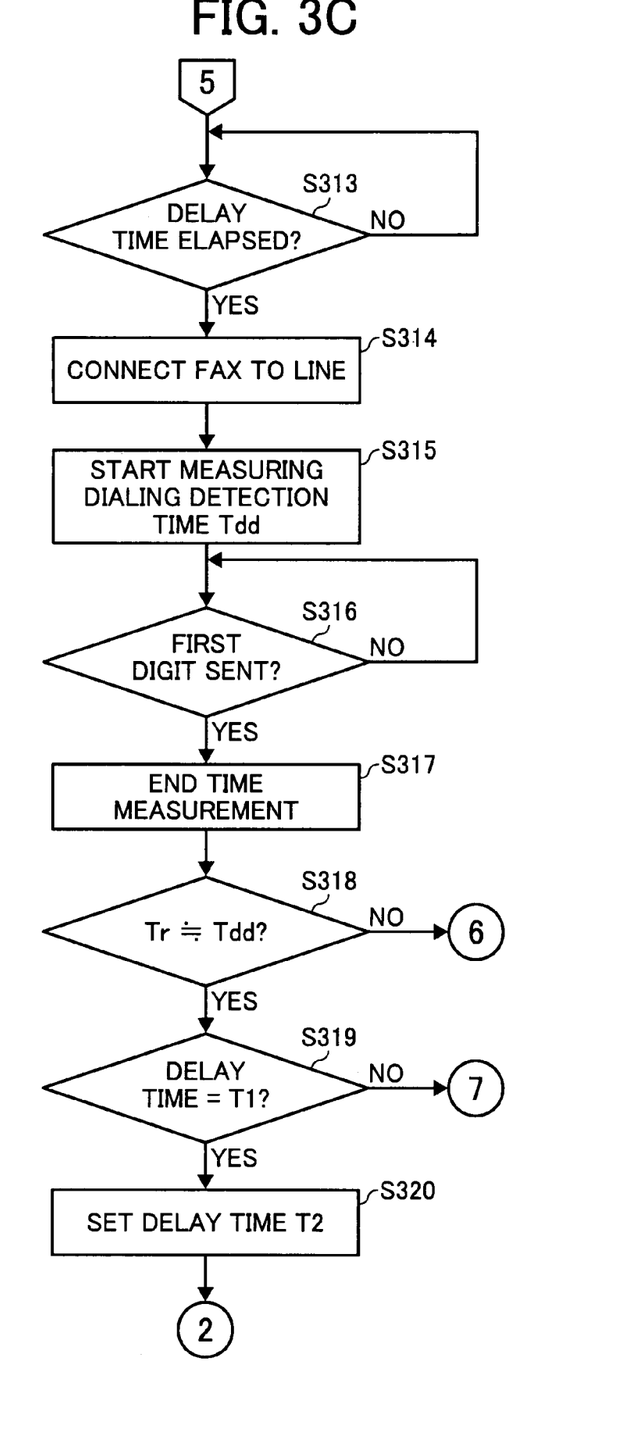
FIG. 3C is a flow chart illustrating an operation of the data communication device of FIG. 2.

When the reference time Tr is recorded ("YES" in step S307), the operation proceeds to step S313. With particular reference to FIG. 3C, in step S313, the operation is suspended until the set delay time has elapsed since the off-hook state of the facsimile 3 is detected in step S306.

After the delay time has elapsed ("YES" in step S313), the switch 18 is turned on to connect the facsimile 3 to the PSTN line 4 (step S314), and the timer 24 starts measuring the dialing detection time Tdd (step S315).

When the dialing detector 23 detects a first digit of the dialing signal ("YES" in step S316), the timer 24 ends measuring the dialing detection time Tdd (step S317).

Then, the controller 11 determines whether or not the measured dialing detection time Tdd is substantially equal to the reference time Tr (step S318).

Figure 3D:
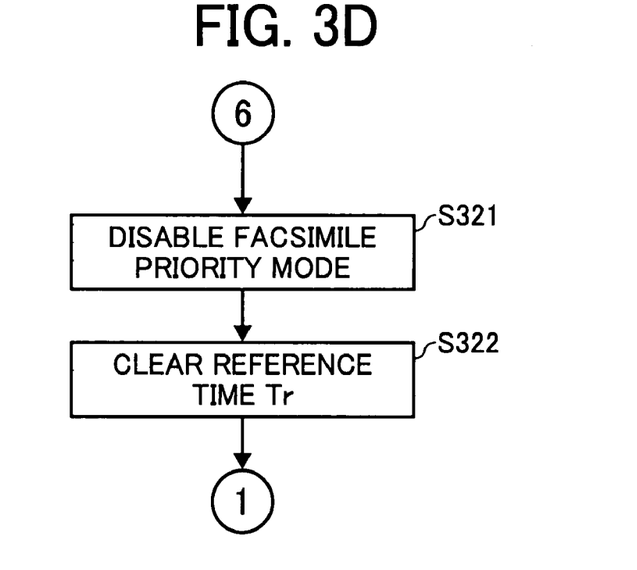
FIG. 3D is a flow chart illustrating an operation of the data communication device of FIG. 2.

When the dialing detection time Tdd is different from the reference time Tr ("NO" in step S318), the operation proceeds to step S321. With particular reference to FIG. 3D, the controller 11 disables the facsimile priority mode (step S321), and clears the reference time Tr to zero (step S322). Afterwards, the operation goes back to step S301.

With further reference to FIG. 3C, when the dialing detection time Tdd is substantially equal to the reference time Tr ("YES" in step S318), the controller 11 determines whether or not the set delay time is T1 (step S319).

Figure 3E:
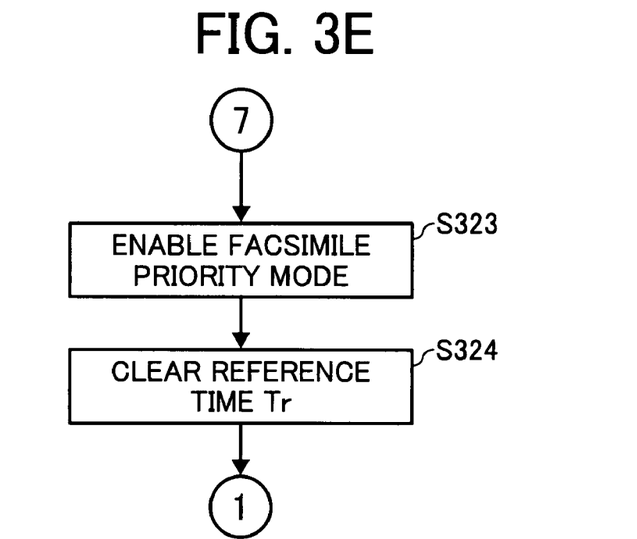
FIG. 3E is a flow chart illustrating an operation of the data communication device of FIG. 2.

When the set delay time is not T1 ("NO" in step S319), the operation proceeds to step S323. With particular reference to FIG. 3E, the controller 11 enables the facsimile priority mode (step S323), and clears the reference time Tr to zero (step S324). Afterwards, the operation goes back to step S301.

With further reference to FIG. 3C, when the set delay time is T1 ("YES" in step S319), the controller 11 sets the delay time to T2 (step S320). Afterwards, the operation goes back to step S302.

As shown in FIGS. 3A through 3E, the reference time Tr is regularly measured, for example, once per three operations for the dial tone detection type apparatus. Consequently, the setting of the facsimile priority mode is performed on a regular basis to avoid a case where the facsimile priority mode is improperly used with the blind dialing type apparatus.

Figure 4:
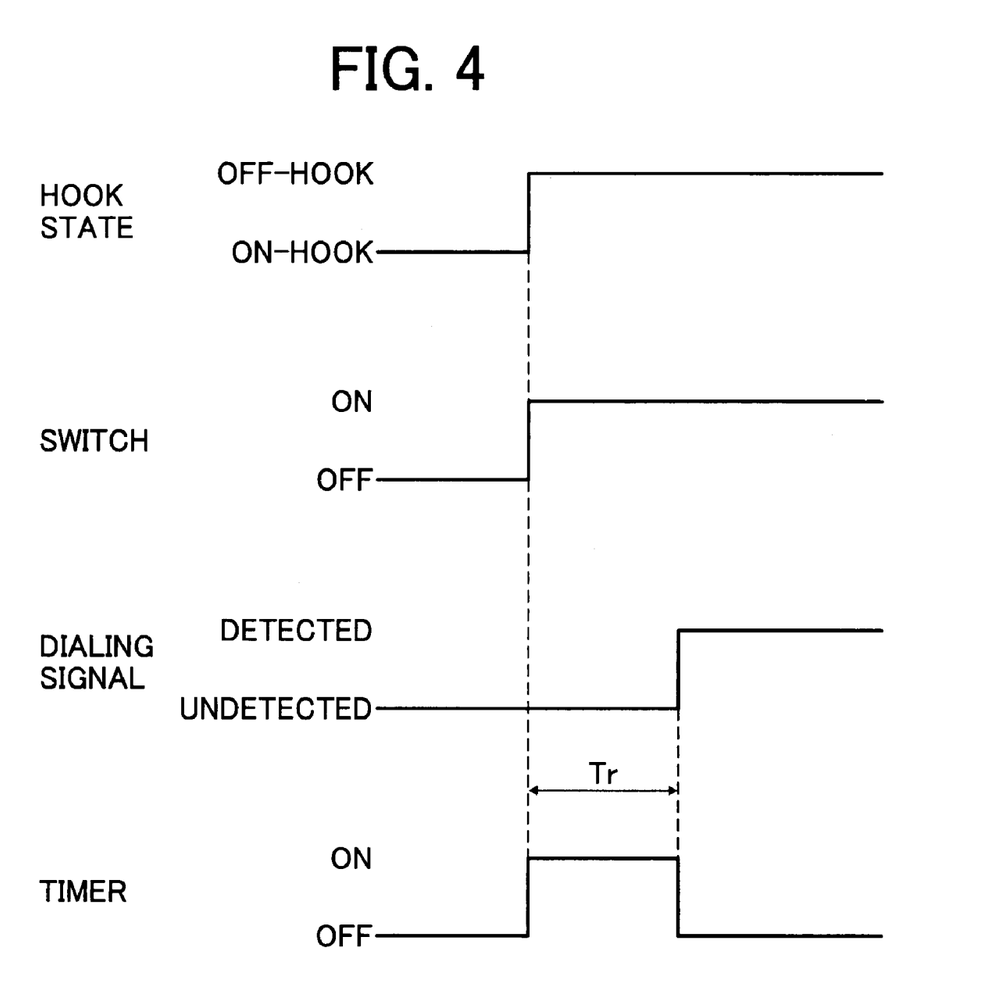
FIG. 4 is a timing diagram illustrating the operation of the data communication device of FIG. 3B.

Referring now to FIG. 4, a timing diagram illustrating the measurement of the reference time Tr is described.

The timing diagram of FIG. 4 contains first through fourth rows. The first row "HOOK STATE" shows a signal indicating the hook state of the facsimile 3. The second row "SWITCH" represents the on/off state of the switch 18. The third row "DIALING SIGNAL" represents the dialing signal detected by the dialing detector 23. The fourth row "TIMER" represents the time measurement by the timer 24.

In FIG. 4, when the facsimile 3 transits to "OFF-HOOK" state, the switch 18 is turned "ON" to connect the fax terminal 17 to the line terminal 16, and the timer 24 becomes "ON" to start measuring time. When the dialing signal is "DETECTED" by the dialing detector 23, the timer 24 becomes "OFF" to end the time measurement, and the measured time is stored as the reference time Tr.

Figure 5A:
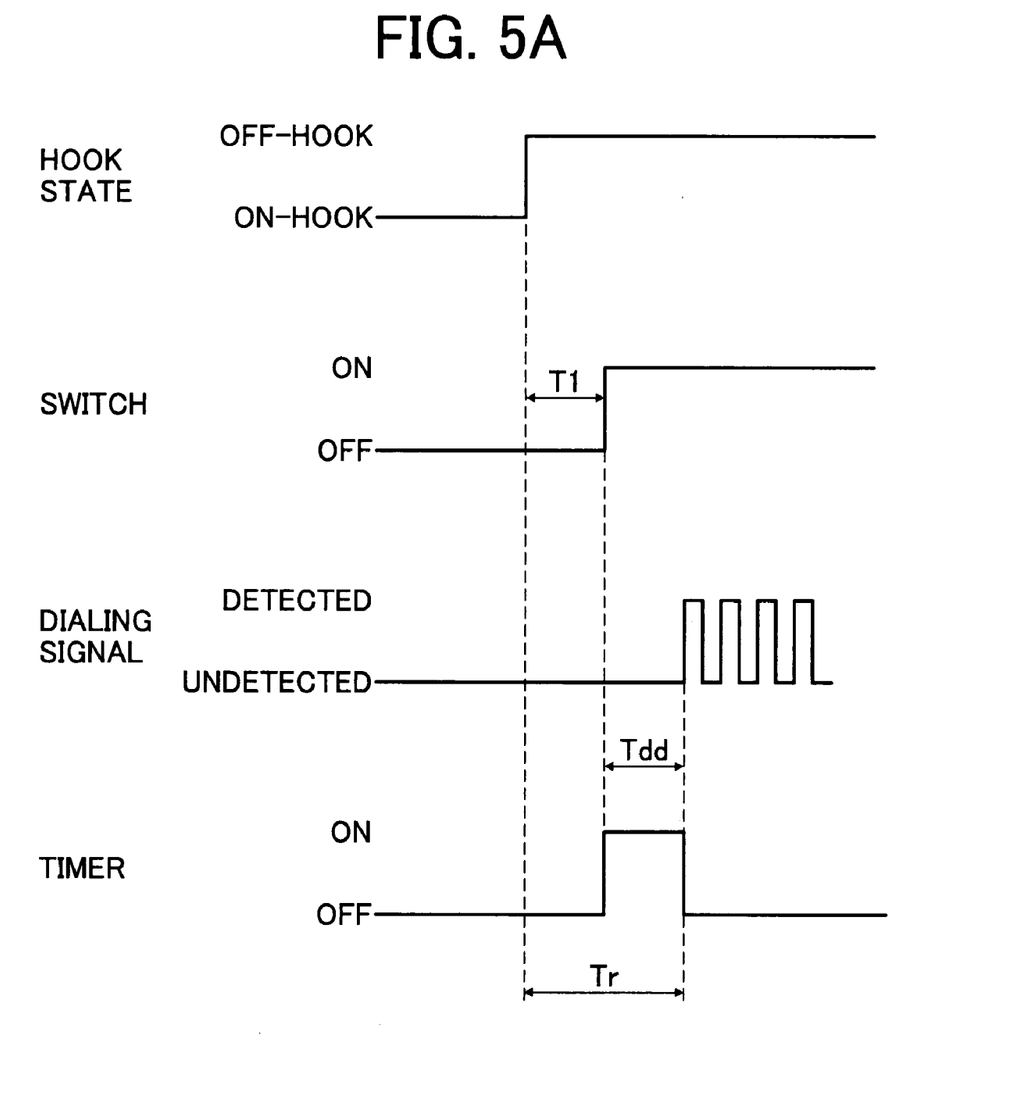
FIG. 5A is a timing diagram illustrating the operation of the data communication device of FIG. 3C.
Figure 5B:
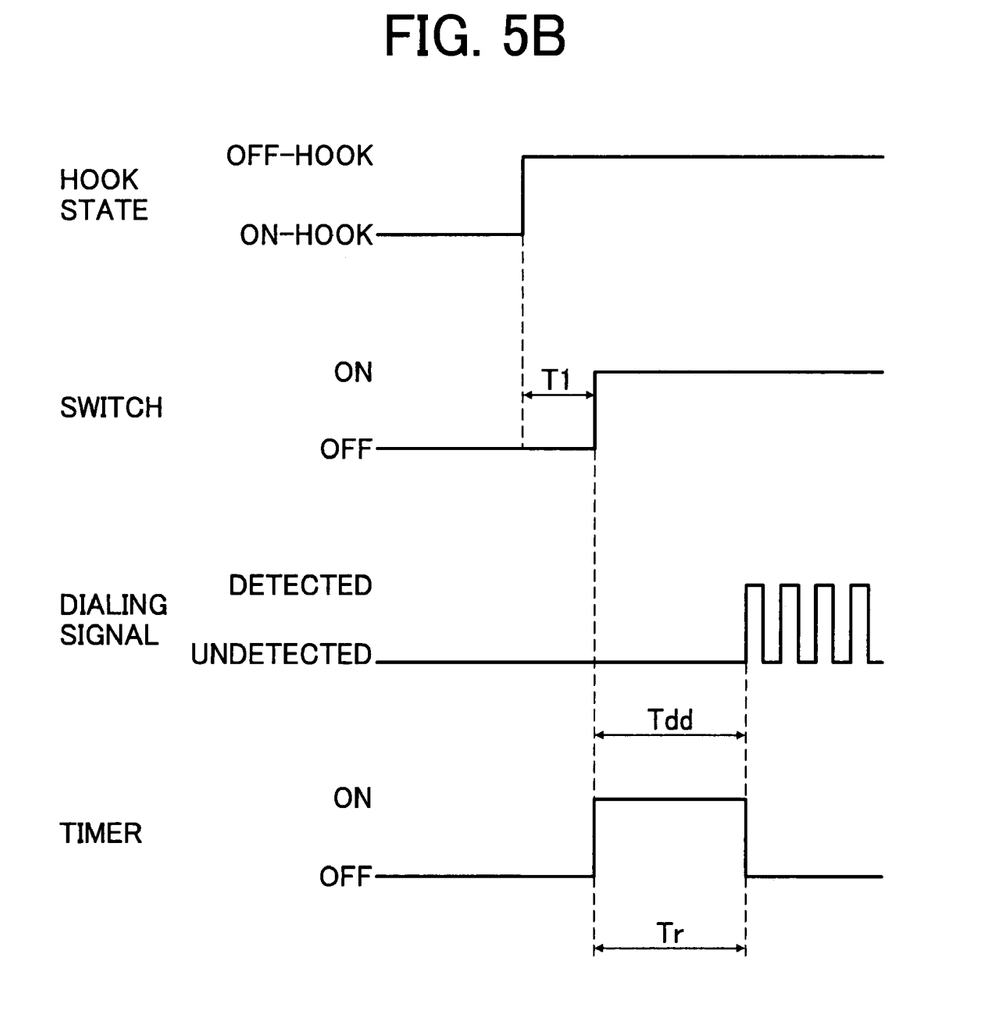
FIG. 5B is a timing diagram illustrating the operation of the data communication device of FIG. 3C.

Referring now to FIGS. 5A and 5B, timing diagrams illustrating the measurement of the dialing detection time Tdd are described.

Each of the timing diagrams of FIGS. 5A and 5B contains first through fourth rows, representing the operation of the components in a similar manner as FIG. 4.

In FIGS. 5A and 5B, first, the facsimile 3 transits to "OFF-HOOK" state. When the set delay time T1 has elapsed after the transition, the switch 18 is turned "ON" to connect the fax terminal 17 to the line terminal 16, and the timer 24 becomes "ON" to start measuring time. Next, when the dialing signal is "DETECTED" by the dialing detector 23, the timer 24 becomes "OFF" to end the time measurement. Then, the measured time is stored as the dialing detection time Tdd.

The measured dialing detection time Tdd is compared with the reference time Tr. The controller 11 determines the type of the facsimile 3 according to a comparison result.

For example, in FIG. 5A, the dialing detection time Tdd is shorter than the reference time Tr by the delay time T1. In this case, the controller 11 identifies the facsimile 3 as blind dialing type to disable the facsimile priority mode.

In FIG. 5B, the dialing detection time Tdd is substantially equal to the reference time Tr. In this case, the dialing detection time Tdd is re-measured for the different delay time T2. When the re-measured dialing detection time Tdd is also substantially equal to the reference time Tr, the controller 11 identifies the facsimile 3 as dial tone detection type to enable the facsimile priority mode.

The setting of the priority mode and the values of the reference time Tr, the dialing detection time Tdd, and the delay time are recorded in the parameter memory 13. Table 1 shows contents of the parameter memory 13.

TABLE 1

Contents of the parameter memory 13

| Parameters | Settings | Remarks |
|---|---|---|
| Facsimile priority mode | "ENABLED" or "DISABLED" | "DISABLED" by default |
| Reference time [mS] | 0 to 20000 | Cleared to 0 when the facsimile priority mode is set. |
| Delay time [mS] | 100 to 3000 | Set as T1 or T2. |
| Dialing detection time [mS] | 0 to 20000 | — |

Embodiments of this invention may be conveniently implemented using a general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. Embodiments of the present invention may also be implemented by the preparation of application specific integrated circuits or by interconnecting an appropriate network of conventional component circuits, as will be readily apparent to those skilled in the art.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Numerous additional modifications and variations are possible in light of the above teachings. It is therefore to be understood that within the scope of the appended claims, the disclosure of this patent specification may be practiced otherwise than as specifically described herein.

What is claimed is:

1. A data communication device, comprising:
a switching mechanism to connect and disconnect a facsimile device to and from a communication line used in common by the data communication device and the facsimile device;
a detector to detect an off-hook state of the facsimile device;
a storage to store one or more delay times to be inserted between detection of the off-hook state of the facsimile device and connection of the facsimile device to the communication line;
a measuring unit to measure a reference time and a dialing detection time and store the reference time and the dialing detection time in the storage, the reference time being an interval between the detection of the off-hook state of the facsimile device and transmission of a first digit dialed by the facsimile device, and the dialing detection time being an interval between the connection of the facsimile device to the communication line, established after lapse of a delay time since the detection of the off-hook state of the facsimile device, and the transmission of a first digit dialed by the facsimile device;
a comparator to compare the reference time and the dialing detection time; and
a controller to enable a facsimile priority function when the reference time and the dialing detection time are substantially equal to each other, and to disable the facsimile priority function when the reference time and the dialing detection time are different from each other, the facsimile priority function being an arrangement in which the data communication device ends communication when the detector detects the off-hook state of the facsimile so that the facsimile uses the communication line.

2. The data communication device according to claim 1, wherein the facsimile priority function is enabled when the reference time is substantially equal to the dialing detection time and different from a sum of the delay time and the dialing detection time, and is disabled when the reference time is substantially equal to the sum of the delay time and the dialing detection time and different from the dialing detection time.

3. The data communication device according to claim 2, wherein the controller is used to set the delay time with varying lengths when the detector detects the off-hook state of the facsimile device.

4. The data communication device according to claim 3, wherein the controller is used to select the delay time from a plurality of time intervals with varying lengths.

5. The data communication device according to claim 2, wherein, when detecting a ringing signal in an idle state in which the facsimile device is disconnected from the communication line, the controller is used to direct the switching mechanism to connect the facsimile device to the communication line.

6. The data communication device according to claim 1, wherein, the controller is used to set the delay time with different lengths when the detector detects the off-hook state of the facsimile device.

7. The data communication device according to claim 6, wherein the controller is used to select the delay time from a plurality of time intervals of different lengths.

8. The data communication device according to claim 1, wherein, when detecting a ringing signal in an idle state in which the facsimile device is disconnected from the communication line, the controller is used to direct the switching mechanism to connect the facsimile device to the communication line.

9. The data communication device according to claim 1, wherein the controller changes the delay time to be inserted between detection of the off-hook state of the facsimile device and connection of the facsimile device to the communication line when the reference time and the dialing detection time are substantially equal to each other.

10. A data communication method, comprising:
switching connection of a facsimile device to a communication line used in common by the data communication device and the facsimile device; detecting an off-hook state of the facsimile device;
measuring a reference time, the reference time being an interval between detection of the off-hook state of the facsimile device and transmission of a first digit dialed by the facsimile device;
storing a delay time to be inserted between the detection of the off-hook state of the facsimile device and connection of the facsimile device to the communication line;
measuring a dialing detection time, the dialing detection time being an interval between the connection of the facsimile device to the communication line, established after lapse of a delay time since the detection of the off-hook state of the facsimile device, and the transmission of a first digit dialed by the facsimile device;
comparing the reference time and the dialing detection time; and
controlling a facsimile priority function to be enabled when the reference time and the dialing detection time are substantially equal to each other, and disabled when the reference time and the dialing detection time are different from each other, the facsimile priority function being an arrangement in which the data communication device ends communication when the detector detects the off-hook state of the facsimile so that the facsimile uses the communication line.

11. The data communication method according to claim 10, wherein the facsimile priority function is enabled when the reference time is substantially equal to the dialing detection time and different from a sum of the delay time and the dialing detection time, and is disabled when the reference time is substantially equal to the sum of the delay time and the dialing detection time and different from the dialing detection time.

12. The data communication method according to claim 11, wherein the delay time is set with different lengths when the off-hook state of the facsimile device is detected.

13. The data communication method according to claim 12, wherein the delay time is selected from a plurality of time intervals of different lengths.

14. The data communication method according to claim 11, wherein, wherein, when a ringing signal is detected while the facsimile device is disconnected from the communication line, the facsimile device is connected to the communication line.

15. The data communication method according to claim 10, wherein the delay time is set with different lengths when the off-hook state of the facsimile device is detected.

16. The data communication method according to claim 15, wherein the delay time is selected from a plurality of given time intervals of different lengths.

17. The data communication method according to claim 10, wherein, when a ringing signal is detected while the facsimile device is disconnected from the communication line, the facsimile device is connected to the communication line.

18. A computer readable medium including program segments for, when executed on a computer device, causing the computer device to implement the method of claim 10.

19. A data communication device, comprising:
means for switching connection of a facsimile device to a communication line used in common by the data communication device and the facsimile device; means for detecting an off-hook state of the facsimile device;
means for measuring a reference time, the reference time being an interval between detection of the off-hook state of the facsimile device and transmission of a first digit dialed by the facsimile device;
means for storing a delay time to be inserted between the detection of the off-hook state of the facsimile device and connection of the facsimile device to the communication line;
means for measuring a dialing detection time, the dialing detection time being an interval between the connection of the facsimile device to the communication line, established after lapse of a delay time since the detection of the off-hook state of the facsimile device, and the transmission of a first digit dialed by the facsimile device;
means for comparing the reference time and the dialing detection time; and
means for controlling a facsimile priority function to be enabled when the reference time and the dialing detection time are substantially equal to each other, and disabled when the reference time and the dialing detection time are different from each other, the facsimile priority function being an arrangement in which the data communication device ends communication when the detector detects the off-hook state of the facsimile so that the facsimile uses the communication line.

20. The data communication device according to claim 19, wherein the facsimile priority function is enabled when the reference time is substantially equal to the dialing detection time and different from a sum of the delay time and the dialing detection time, and is disabled when the reference time is substantially equal to the sum of the delay time and the dialing detection time and different from the dialing detection time.

21. The data communication device according to claim 19, wherein the means for controlling is used for setting the delay time with different lengths when the off-hook state of the facsimile device is detected.

* * * * *